United States Patent [19]

Kuroda et al.

[11] 3,917,873

[45] Nov. 4, 1975

[54] EGG WHITE COMPOSITION HAVING IMPROVED WHIPPING PROPERTIES AND PROCESS FOR PRODUCING THE SAME

[75] Inventors: Namio Kuroda; Shigeaki Mogi, both of Tokyo, Japan

[73] Assignee: Q. P. Corporation & Teijin Limited, Tokyo, Japan

[22] Filed: Feb. 14, 1974

[21] Appl. No.: 442,656

[30] Foreign Application Priority Data

Feb. 15, 1973 Japan.............................. 48-17907

[52] U.S. Cl................................. 426/568; 426/614
[51] Int. Cl.² ........................ A23J 3/02; A23L 1/32
[58] Field of Search ........... 426/163, 165, 211, 213, 426/227, 228, 329, 380, 348; 195/31 R

[56] References Cited

UNITED STATES PATENTS

| | | | |
|---|---|---|---|
| 3,043,700 | 7/1962 | Szczesniak | 426/165 X |
| 3,061,444 | 10/1962 | Rogers et al. | 426/213 X |
| 3,219,457 | 11/1965 | Ziegler, Jr. et al. | 426/348 |
| 3,628,968 | 12/1971 | Noznick | 426/163 |
| 3,711,299 | 1/1973 | Ziegler, Jr. | 426/211 |

*Primary Examiner*—S. Leon Bashore
*Assistant Examiner*—M. Steven Alvo

[57] ABSTRACT

An egg white composition having improved whipping properties is disclosed, together with a process for producing the same which comprises the admixture of cyclodextrins and egg whites.

11 Claims, No Drawings

3,917,873

EGG WHITE COMPOSITION HAVING IMPROVED WHIPPING PROPERTIES AND PROCESS FOR PRODUCING THE SAME

BACKGROUND OF THE INVENTION

It is well known that raw egg whites have intrinsic whipping properties and, for this reason, they are frequently used as raw materials to impart a fluffy or whipped texture to processed foods. Above all, in bakeries and confectioneries, the whipping properties of raw materials are the primary factor influencing the volume and texture of the products and hence often determine the quality of the resulting products. Accordingly, improvement in the whipping properties of egg whites has been much desired. Generally the whipping properties of frozen egg whites are reduced over long storage, while those of dried egg whites have a tendency to become so reduced as to be almost irrecoverable even when the egg whites are reconstituted in water. Egg whites produced by commercially breaking the shell eggs usually contain a small quantity of egg yolks; generally, the higher the content of egg yolks in the egg whites, the more pronounced is the above tendency to reduce the whipping properties.

Prior art methods to solve these problems include the use of various additives which are mixed with egg whites and the mixture subjected to drying treatment, for example, the addition of okragum (U.S. Pat. No 3,219,457), sodium biacetate, polyphosphates, caprilinates, acetylmethylcarbinol, oleinates, bile salts and the like. It has also been found that when egg whites having a higher content of egg yolk than usual are subjected to freezing treatment with the addition of 0.05 to 0.07 wt. percent of papain (Japanese Patent Publication No. 35-8639) or 0.01 to 0.10wt. percent of specific protease (Japanese Patent Publication No. 45-40260), some advantageous results may be obtained.

However, some of the above-mentioned additives are not officially permitted as food additives in certain countries and cannot be applied effectively to the treatment of frozen egg whites; moreover, the above-mentioned enzymes are unable to be used effectively to compensate for the reduced whipping properties resulting from drying egg whites. In addition, the taste and the color of egg whites are usually affected adversely by the use of such additives and enzymes.

Although disaccharides such as succharose and lactose are well known as whipping agents for egg yolks, these are not effective for egg whites. In many cases, roasted dextrins are used as auxiliary whipping agents for egg whites, but they are used effectively only together with other known whipping agents. Accordingly the effect of roasted dextrins is not satisfactory when they are applied alone to liquid egg whites as whipping agents. This will be realized by referring to the Test Examples, hereinafter set forth, in which the whipping properties of these known agents are contrasted with those of cyclodextrins.

BRIEF SUMMARY OF THE INVENTION

More specifically, this invention relates to egg white compositions having improved whipping properties comprising additives not heretofore used for this purpose combined with egg whites which are utilized under various conditions; and to process for producing the same. egg whites which are utilized under various conditions; and to a process for producing the same.

It is a primary object of the present invention to provide an egg white composition with good whipping properties.

It is another object of the present invention to provide an egg white composition with good whipping properties utilizing raw egg whites, pasteurized egg whites, dried egg whites, and indeed egg whites containing the whole yolk.

It is still another object of the present invention to provide a process for producing an egg white composition with good whipping properties.

These and other objects are accomplished by providing an egg white composition comprising raw egg whites (or defrosted egg whites, reconstituted egg whites and the like) and a minor amount sufficient to impart enhanced whipping properties to the composition of a cyclodextrin. Preferably, this amounts to from about 0.10% to about 1.0% by weight, based on the raw egg whites (or defrosted egg whites, reconstituted egg whites and the like), of cyclodextrins. In the case of dried egg whites, some what higher proportions are added before drying, such as from about 0.50% to about 2.50% by weight of cyclodextrins based on the raw egg whites before drying, and somewhat less when the egg whites are freeze-dried. When dried egg whites containing no additives are reconstituted with water, from about 0.10% to 1.0% of cyclodextrin by weight of the resulting mixture is usually adequate. Generally, an amount of the cyclodextrin ranging from about 0.10% to 2.50% by weight of the raw, thawed or reconstituted egg whites is suitable for most purposes, although more may be employed where the sweet taste imparted by further quantities is not objectionable.

Thus the present invention provides the means for readily producing an egg white composition with good whipping properties, adapted for many uses, and in which egg whites under a variety of conditions can be imparted with improved whipping properties, and frozen and dried egg whites can be endowed with whipping properties superior to those of raw egg whites without any adverse effects on the taste and the color of the product.

The invention will become more apparent from the following more detailed description and the appended claims.

DETAILED DESCRIPTION OF THE INVENTION

In the present specification, the term "egg whites" is defined as encompasing raw egg whites obtained by breaking the shell of eggs manually or mechanically, and separates the same from the egg yolks as far as possible; egg whites obtained by freezing, drying, or freeze-drying the above raw egg whites; and egg whites obtained from defrosted egg whites or solutions obtained by reconstituting dried or freeze-dried egg whites with water in substantially the proportions contained in raw egg whites, followed by pasteurizing; and wherein the above egg whites may contain a certain quantity of egg yolks (if desired) as hereinafter described. The term "whipping properties" is defined in relation to the whipping characteristics and whipping stability when liquid egg whites are beaten at high speed in the presence of air.

According to the present invention, cyclodextrins can be used effectively for promoting enhanced whipping properties when added to raw, frozen and dried egg whites, and when added to liquid egg whites obtained by defrosted frozen egg whites or reconstituting dried egg whites. Moreover, the cyclodextrins may be used effectively for this purpose whether they are mixed directly with liquid egg whites or first added to raw materials (other than liquid egg whites) to be processed by admixture with egg whites. For instance, in bakeries and confectioneries the invention may be used advantageously by adding cyclodextrins first to wheat flour and then mixing egg whites with the wheat flour to obtain the desired whipping properties.

The effect of cyclodextrins is most pronounced when the agents are added to raw egg whites before they are subjected to freezing or drying treatments. Provided that the raw egg whites added with cyclodextrins are sufficiently mixed, the mixture can be frozen or dried as the occasion may demand without producing any practical disadvantages. In either case, the whipping properties of the egg whites are remarkably improved when the egg whites in liquid form are beaten at high speed alone or in admixture with other materials.

The amount of cyclodextrins to be added depends on whether the egg whites are raw or subjected to freezing or drying. Practically, the preferred amount of cyclodextrins is from about 0.10 to 1.0 percent by weight for raw or frozen egg whites and from about 0.50 to 2.5 percent by weight (in terms of the weight of raw egg whites) for dried egg whites. For defrosted egg whites or egg whites reconstituted with water, the amount of cyclodextrins added is preferably about the same wt. percent as for raw egg whites. When the amount of cyclodextrins does not reach the above-mentioned range, the whipping properties of the egg whites are little improved. On the other hand, when it exceeds the range, the whipping properties of the egg whites are improved very little, if any, over the maximum of the range, and also the sweet taste imparted by the cyclodextrins changes the taste of the finished egg white or resulting product in which it is used, which could be objectionable if sweetness is not desired.

Accordingly, it is especially preferred that the amount of the cyclodextrins to be added be more than 0.50 percent and less than 1.0 percent by weight of the raw egg whites or the equivalent thereof, because no problem then normally occurs when the cyclodextrin egg white compositions are subjected to further treatment such as freezing, drying and the like.

It has also been found that when liquid egg whites contain a limited to a whole egg quantity of egg yolk per quantity of egg white and are subjected to the drying treatment, the effects of cyclodextrins are increased by incorporating therewith a quantity of succharose, lactose or the like.

The present invention is thus applicable not only to pure egg whites, but also to egg whites containing egg yolks, and indeed, to the whole egg, the desired whipping properties being generally lowered when the amount of egg yolk mixed in the egg whites exceeds about 34 percent by weight of the mixture, which corresponds substantially to the content of the yolk in the whole egg.

Cyclodextrins, the whipping agents used in the present invention, are also referred to as Schardinger-dextrin, which has a structure in ring form consisting of 6 to 8 or more molecular units of D-glucose bonded together by an α-1, 4-glucoside bond. Generally, cyclodextrins have been mainly used as antioxidants and odor-keeping agents, and for racemic resolution of optical activity in various chemicals.

Among those cyclodextrins useful in accordance with this invention are α-cyclodextrin which consists of 6 molecular units of D-glucose, β-cyclodextrin which consists of 7 molecular units thereof, and γ-cyclodextrin which consists of 8 molecule units thereof. In the present invention, β-cyclodextrin is preferably employed.

Although applicants do not wish to be bound by any theory for this invention, it is believed that the mechanism for the improved whipping properties in the present invention is based on a reaction in which egg whites and cyclodextrins act mutually to form a complex that confers an increase in whipping properties. Although the reaction mechanism is not known precisely, the reaction in this invention is a peculiar one resulting from the characteristic structure of cyclodextrins since similar effects cannot be obtained when the carbohydrates, such as succharose, lactose, roasted dextrin and the like are added alone to egg whites.

According to the present invention, the whipping properties of egg whites subjected to freezing or drying or other treatment when subjected to the influence of cyclodextrins, are higher than those of raw egg whites, without adversely effecting the taste and the color thereof, and the resulting egg whites can be used extensively as raw materials for bakery, confectionary and pharmaceutical products, and the preparation of fish cakes and many powdered foods.

The following Examples are more fully illustrative of the practice of the present invention:

EXAMPLE 1

To raw egg whites containing about 0.25 percent by weight of egg yolks, obtained by breaking the shell egg mechanically on a commercial scale, is added the indicated quantities by weight of cyclodextrin shown by the following Table 1. The resulting mixture was beaten at 460 r.p.m. for 90 seconds and tested to measure the whipping characteristics (indicated as specific volume in cc/g) and whipping stability in terms of foam solidity as measured by the weight sink method (the foam solidity without addition of cyclodextrin is assumed to be 100).

A comparative test was carried out in the same way with egg whites mixed with the indicated quantities of roasted dextrin (polymerization degree: 38 to 42).

The test results are shown in the following Table 1:

TABLE 1

| added quantity | Cyclodextrin | | Roasted Dextrin | |
| --- | --- | --- | --- | --- |
| | whipping characteristics | whipping stability | whipping characteristics | whipping stability |
| none | 7.36 | 100 | 7.36 | 100 |
| 0.10% | 7.90 | 150 | 7.40 | 98 |
| 0.25 | 9.24 | 150 | 7.46 | 100 |
| 0.50 | 9.83 | 160 | 7.32 | 102 |
| 0.75 | 10.72 | 157 | 7.38 | 104 |
| 1.00 | 11.02 | 158 | 7.30 | 100 |
| 1.25 | 11.05 | 154 | 7.40 | 100 |

EXAMPLE 2

An egg white composition according to Example 1 was packed in polyethylene pouches, sealed and maintained at −15°C in the frozen state. After lapse of periods of one and three months, the egg whites were taken out and defrosted at room temperature. The defrosted egg whites were then beaten at 460 r.p.m. for 90 seconds and the whipping characteristics (indicated as specific volume cc/g.) were measured. A comparative test was carried out in the same way with roasted dextrins (polymerization degree: 38 to 42).

The results of these tests are shown in the following Table 2.

Table 2

|  | ADDED QUANTITY | BEFORE STORAGE | AFTER 1 MONTH | AFTER 3 MONTHS |
|---|---|---|---|---|
|  | none | 7.36 | 6.03 | 5.42 |
|  | 0.10% | 7.90 | 7.91 | 7.41 |
|  | 0.25 | 9.24 | 9.55 | 9.16 |
| cyclo- | 0.50 | 9.83 | 10.88 | 10.40 |
| dextrin | 0.75 | 10.72 | 11.22 | 10.98 |
|  | 1.00 | 11.02 | 11.85 | 11.56 |
|  | 1.25 | 11.05 | 11.81 | 11.60 |
|  | none | 7.36 | 6.03 | 5.42 |
|  | 0.10% | 7.40 | 6.09 | 5.54 |
| roasted | 0.25 | 7.46 | 6.17 | 5.73 |
| dextrin | 0.50 | 7.32 | 6.05 | 6.01 |
|  | 0.75 | 7.38 | 6.04 | 5.60 |
|  | 1.00 | 7.30 | 6.18 | 5.82 |
|  | 1.25 | 7.40 | 6.20 | 5.88 |

The data of the above Table 2 shows the fact that the whipping characteristics of egg whites containing cyclodextrins and stored under freezing for 1 to 3 months are improved in contrast with that of the egg whites prior to storage; and far superior to the characteristics of egg whites containing roasted dextrin under the same conditions.

The whipping stability of egg whites without additives and stored under freezing was not significantly changed in contrast with that of the egg whites prior to storage.

EXAMPLE 3

To egg whites containing about 10 percent by weight of egg yolks the indicated quantities of additives shown in the following Table 3 were added. The resulting products were spray-dried. After storing for one month, one part of the dried egg whites thus obtained was dissolved in 7 parts of water. The egg white solution thus obtained was beaten at 460 r.p.m. for 90 seconds and tested to measure the whipping characteristics (indicated as specific volume cc/g) and the whipping stability in terms of foam solidity as measured by the weight sink method (the foam solidity of the reconstituted egg white solution without cyclodextrins is assumed to be 100).

A comparative test was carried out in the same way with egg whites added with the indicated quantities of roasted dextrins (polymerization degree: 40 to 45).

The results are shown in the following Table 3.

Table 3

| addi-tives added quantity | cyclodextrin | | roasted dextrin | |
|---|---|---|---|---|
|  | whipping characteristics | whipping stability | whipping characteristics | whipping stability |
| none | 3.25 | 100 | 3.25 | 100 |
| 0.50% | 4.95 | 200 | 3.38 | 106 |
| 1.00 | 6.10 | 320 | 3.86 | 120 |
| 1.50 | 7.88 | 425 | 4.54 | 137 |
| 2.00 | 8.07 | 456 | 4.90 | 140 |
| 2.50 | 8.12 | 440 | 4.75 | 158 |
| 3.00 | 8.16 | 435 | 4.65 | 156 |

EXAMPLE 4

To 99.25 Kg. of raw egg whites obtained by mechanically breaking the egg shell and removing the egg yolks, 750g. of cyclodextrin were added to give a mixture with a total weight of 100kg. The mixture was beaten at 600 r.p.m. for 90 seconds and thereby the raw egg whites with good whipping properties were obtained.

Egg whites thus obtained exhibited whipping characteristics of 1.5 times that of raw egg whites prior to treatment, and the whipping characteristics continued to be stable.

An angel cake was prepared by using the treated egg whites as raw materials. The resulting product had a remarkably improved texture, and also the taste and the color were not adversely affected in any way.

EXAMPLE 5

To 99.200 kg. of raw egg whites 800g. of cyclodextrin were added to give a mixture with a total weight of 100kg. which were stored under freezing at −15°C for 3 months. The frozen product was defrosted at room temperature and beaten at 600 r.p.m. for 60 seconds. The resulting liquid egg whites had superior whipping properties to those of egg whites immediately after breaking and also the taste and the color were not adversely affected in any way.

EXAMPLE 6

Raw egg whites stored under freezing at −15°C for 1 month were defrosted at room temperature and to 99.1 Kg. thereof were added 900g of cyclodextrin to give a mixture with the total weight of 100kg, which was then beatin at 600 r.p.m. for 120 seconds.

The resulting liquid egg white had whipping properties superior to those of egg whites immediately after breaking and also the taste and the color were not adversely affected in any way.

EXAMPLE 7

To 98.3 Kg. of raw, whole eggs were added 1.5kg. of cyclodextrin and 200g of lactose to give a mixture of 100kg in total weight which was mixed together and then spray-dried. One part of this mixture was dissolved in 7 parts of water and beaten at 460 r.p.m. for 120 seconds. The whipping properties of the liquid reconstituted whole egg were improved to a higher value than that of the raw whole egg without the additives, and the taste and the color were not affected in any way.

EXAMPLE 8

To 89 kg. of spray-dried whole eggs 10 kg. of cyclodextrin and 1kg of succharose were added to give a mixture of 100kg, in total weight which was thoroughly mixed. One part of the resulting mixture was dissolved in 7 parts of water to produce the equivalent of the liquid whole egg. Said mixture was beaten at 460 r.p.m. for 120 seconds. The whipping properties of the reconstituted liquid whole egg were improved to a higher value than that of the raw whole egg, and the taste and the color were not affected in any way.

EXAMPLE 9

2.4kg. of wheat flour were first mixed with 40g. of cyclodextrin and then with 3.5kg of sugar, 60g. of cream of tarter, a suitable amount of flavoring, and 4.0kg of defrosted egg whites after storage at −15°C for a month. After beating together, the mixture was baked to produce an angel cake which had remarkably improved properties in terms of its volume and texture.

EXAMPLE 10

To 99.8 kg. of raw egg whites 200g. of beta-cyclodextrin were added to provide a mixture of 100kg. in total weight and then mixed well. The mixture was pasteurized at 56°C for 3 minutes by a plate heat exchange pasteurizer. The pasteurized product was beaten at 600 r.p.m. for 90 seconds by a Hobert Mixer (Type: C-100TG). The shipping properties of the above pasteurized composition were improved to a higher value than that of raw egg whites, and the taste and the color were not affected in any way.

EXAMPLE 11

Raw egg whites were pasteurized at 55°C for 5 minutes by a plate heat exchange pasteurizer and then cooled to 15°C. To 99.6kg. of pasteurized egg whites 400g of beta-cyclodextrin were added to provide a mixture of 100kg in total weight and then mixed well. The mixture was stored at −15°C under freezing for a month, then defrosted in running water and beaten at 600 r.p.m. for 90 seconds. The whipping properties of the pasteurized egg white composition were improved to about 1.2 times that of pasteurized egg whites without beta-cyclodextrin and the whipping characteristics of the above composition continued in stability.

Resort may be had to such modifications and equivalents as fall within the spirit of the invention and the scope of the appended claims.

What we claim is:

1. A process for producing an egg white composition having improved whipping properties which comprises mixing egg whites selected from the group consisting of raw egg whites, pasteurized egg whites, defrosted egg whites, dried egg whites, egg whites reconstituted with water and egg whites including egg yolk in substantially the proportions thereof contained in whole eggs, with cyclodextrin in an amount of from about 0.10% to about 2.5% by weight of the egg whites, based on a raw egg white content of the mixture.

2. A process according to claim 1, wherein said cyclodextrin is $\beta$-cyclodextrin.

3. A process according to claim 1, wherein the amount of cyclodextrin employed is from about 0.50% to about 1.0% by weight of the egg whites.

4. A process according to claim 1, which includes the additional step of freezing the resulting mixture.

5. A process according to claim 4, wherein the amount of cyclodextrin employed is from about 0.10% to about 1.0% by weight, based on the raw egg white content of the mixture.

6. A process according to claim 1, which includes the additional step of drying the resulting mixture.

7. A process according to claim 6, wherein the amount of cyclodextrin employed is from about 0.5% to about 2.5% of the raw egg white content of the mixture before drying.

8. An egg white composition having improved whipping properties comprising egg whites and from about 0.10% to about 2.5% by weight of cyclodextrin, based on the content of raw egg whites.

9. An egg white composition according to claim 8, wherein said cyclodextrin is $\beta$-cyclodextrin.

10. An egg white composition according to claim 8, wherein said egg whites are selected from the group consisting of raw egg whites, dried egg whites, egg whites reconstituted with water, and egg whites including egg yolk in substantially the proportions thereof contained in whole eggs.

11. An egg white composition according to claim 10, wherein the cyclodextrin employed is from about 0.50% to about 1.0% by weight of raw egg whites.

* * * * *